E. J. AUL.
FLOWER POT.
APPLICATION FILED FEB. 12, 1910.
964,196.
Patented July 12, 1910.
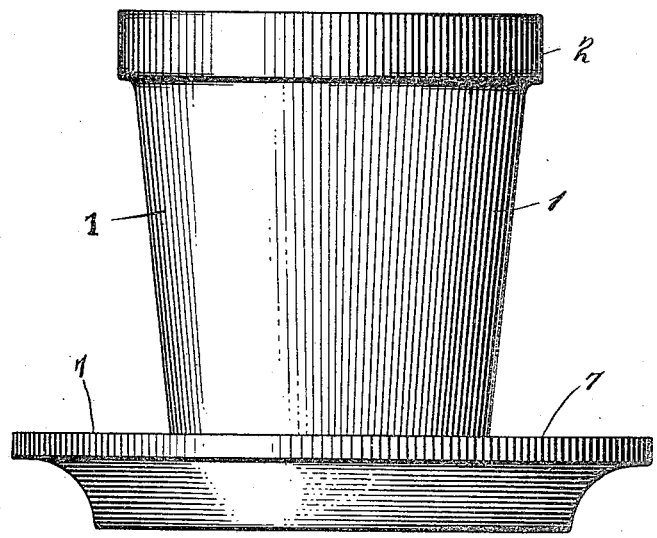
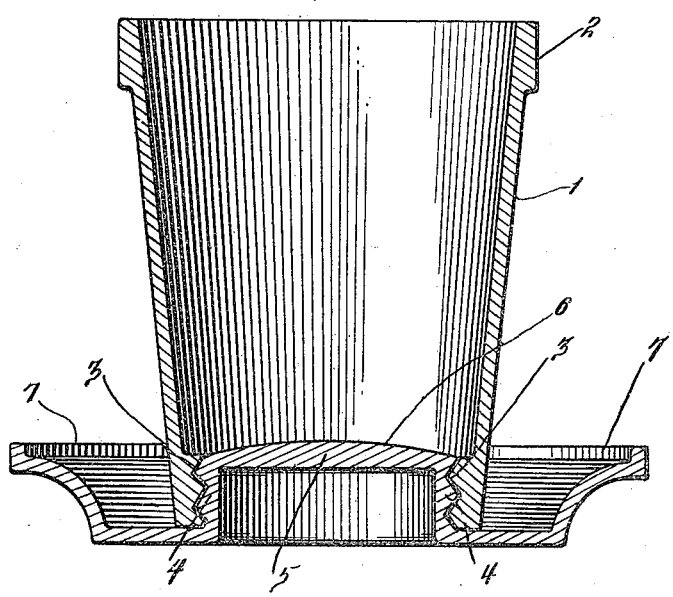
Witnesses
Samuel Payne
K. H. Butler
Inventor
E. J. Aul.
By
Attorneys.

UNITED STATES PATENT OFFICE.

EDWARD J. AUL, OF PITTSBURG, PENNSYLVANIA.

FLOWER-POT.

964,196.  Specification of Letters Patent.  Patented July 12, 1910.

Application filed February 12, 1910. Serial No. 543,618.

*To all whom it may concern:*

Be it known that I, EDWARD J. AUL, a citizen of the United States of America, residing at Pittsburg, in the county of Allegheny and State of Pennsylvania, have invented certain new and useful Improvements in Flower-Pots, of which the following is a specification, reference being had therein to the accompanying drawing.

This invention relates to flower pots and the object of my invention is to provide a pot with a detachable bottom or base, which will serve functionally as a saucer or pan in connection with the pot for collecting water or other matter that may drain from or over the sides of the pot.

Another object of the invention is to provide a flower pot or receptacle with a detachable pan or saucer, the pan or saucer when attached to the pot facilitating the moving of the same.

A further object of this invention is to provide a flower pot or similar receptacle with a detachable bottom or base permitting of easy access being had to the crock for cleansing purposes.

With the above and other objects in view, the invention consists in the novel construction and arrangement of parts to be hereinafter described in detail and then claimed.

In the drawings:—Figure 1 is an elevation of a pot or receptacle constructed in accordance with my invention, Fig. 2 is a vertical sectional view of the same.

In the drawings 1 denotes an inverted frusto-conical shaped shell constituting the body of the pot or receptacle, said shell having the upper outer edges thereof provided with a peripheral enlargement or flange 2 serving functionally as a rim or hand grip. The lower inner edges of the shell 1 are provided with circumferentially arranged interior threads 3 adapted to receive the exteriorly arranged threads 4 of an inverted cup 5 constituting the bottom or base of the shell 1. The inverted cup shaped base loosely engages the threads 3, and the upper surface of said base is rounded, as at 6 to deflect water toward the outer edges of the base, whereby the water can drain or ooze between the inverted cup shaped base and the shell and thereby prevent water from accumulating in the shell and in all probabilities injure plants placed therein for propagation or ornamentation purposes.

The inverted cup shaped base 5 is formed integral with a pan or saucer 7, said base forming the central part of the pan or saucer while the edges of the pan or saucer surround the lower edges of the shell and provide a receptacle for water or other matter that drains or is thrown off from the lower or upper edges of the shell 1.

The inclination between the shell 1 and the pan or saucer 7 is sufficient to retain these two parts in an assembled position, and yet permit of the proper irrigation of soil or earth placed in the shell 1.

The pot or receptacle can be made of various sizes and shape and is preferably made of earthenware, similar to an ordinary flower pot.

Having now described my invention, what I claim as new is:—

1. A pot, comprising a shell, an inverted cup shaped base loosely mounted in the bottom of said shell, and a pan or saucer carried by said base.

2. A pot comprising a shell having the lower end thereof provided with interior threads, a saucer having a central portion adapted to screw into the bottom of said shell while the outer edges of said saucer surround said pot.

3. A pot of the type described, comprising an inverted frusto-conical shaped shell, an inverted cup shaped base detachably mounted in the bottom of said shell, and a saucer carried by said base.

4. A pot of the type described, comprising a shell, a saucer, means for detachably connecting said saucer to the lower edges of said shell, said means including an inverted cup shaped base adapted to loosely screw into the lower end of said shell.

5. A pot comprising a shell having the lower inner edges thereof provided with threads, and a saucer having a central portion adapted to screw into said shell and loosely engage the threads thereof.

6. A pot of the type described, comprising a shell, an inverted cup shaped base adapted to loosely screw into the lower end of said shell and provide a receptacle for the reception of matter from said shell.

In testimony whereof I affix my signature in the presence of two witnesses.

EDWARD J. AUL.

Witnesses:
C. T. HOOD,
C. V. BROOKS.